United States Patent
Darke

(10) Patent No.: US 7,286,909 B2
(45) Date of Patent: Oct. 23, 2007

(54) AIRCRAFT BRAKING METHOD AND APPARATUS

(75) Inventor: Jason William Darke, Bristol (GB)

(73) Assignee: Airbus UK Limited, Bristol (GB)

( * ) Notice: Subject to any disclaimer, the term of this patent is extended or adjusted under 35 U.S.C. 154(b) by 0 days.

(21) Appl. No.: 10/517,329

(22) PCT Filed: Jun. 10, 2003

(86) PCT No.: PCT/GB03/02506

§ 371 (c)(1),
(2), (4) Date: Dec. 9, 2004

(87) PCT Pub. No.: WO03/104057

PCT Pub. Date: Dec. 18, 2003

(65) Prior Publication Data

US 2005/0240321 A1    Oct. 27, 2005

(30) Foreign Application Priority Data

Jun. 11, 2002  (GB) ................................. 0213372.6

(51) Int. Cl.
*B60T 8/00*      (2006.01)
*B60T 8/32*      (2006.01)
(52) U.S. Cl. ............................. 701/3; 701/78; 701/80
(58) Field of Classification Search .................... None
See application file for complete search history.

(56) References Cited

U.S. PATENT DOCUMENTS

| 2,824,713 | A | | 2/1958 | Kelley |
| 3,382,012 | A | | 5/1968 | Lucien |
| 3,582,151 | A | | 6/1971 | Ruof |
| 4,404,633 | A | * | 9/1983 | Goicoechea ................. 701/70 |
| 4,613,190 | A | | 9/1986 | Johnson |
| 4,958,512 | A | | 9/1990 | Johnsen |
| 5,167,385 | A | | 12/1992 | Hafner |
| 5,964,511 | A | | 10/1999 | Miyazaki |

FOREIGN PATENT DOCUMENTS

| EP | 0 414 715 B1 | 3/1991 |
| GB | 1018548 | 1/1966 |
| GB | 1077636 | 8/1967 |
| WO | WO89/09710 A1 | 10/1989 |

* cited by examiner

*Primary Examiner*—Michael J. Zanelli
(74) *Attorney, Agent, or Firm*—Patterson, Thuente, Skaar & Christensen, P.A.

(57) ABSTRACT

An aircraft is decelerated by applying a braking force to a wheel of the aircraft as it moves along the ground. An anti skid controller calculates the braking force to be applied by taking into account data relating to the vertical load transmitted between the ground and the wheel and data relating to the slip between the ground and the wheel. Predictions (box 13b) made regarding how the vertical load will change and data (box 13a) concerning the relationship between slip and the ground to wheel friction coefficient are both taken into account when calculating the braking force to be applied. Skids may thereby be predicted in advance and may be reduced or even avoided.

25 Claims, 3 Drawing Sheets

AIRCRAFT BRAKING METHOD AND APPARATUS

BACKGROUND OF THE INVENTION

The present invention relates to decelerating an aircraft and, in particular, to a method of applying a braking force to the wheel of an aircraft and to a braking apparatus for performing such a method.

After having touched-down on landing, an aircraft is caused to decelerate in various ways, one example of which being by means of application of a braking torque to the wheels of the aircraft. It is desirable to decelerate the aircraft in an efficient and controlled manner. Thus, it is desirable to maximise the pilots demand for deceleration of the aircraft by means of the braking torque applied to the wheels. The wheels of the aircraft are prone, when subjected to a sufficient braking torque, to skidding and may, in severe cases, lock-up completely. It will be appreciated that there is generally some slip between the wheels and the ground when the aircraft is moving, but that above a given amount of slip the wheels can be considered as skidding. When the wheels are skidding the ability of the aircraft to decelerate by application of the brakes is impaired. Aircraft are therefore commonly provided with anti-skid systems.

A known aircraft anti-skid system for a single wheel of an aircraft monitors various parameters including, in particular, the rotational speed of the wheel and the speed of the aircraft. From the measured values of the rotational speed of the wheels and the speed of the aircraft, and from knowing the rolling radius of the wheel, the amount of slip, $\lambda$, may be calculated from the equation:

$\lambda = 1 - \omega R/V$, where $\omega$ = the rotational speed of the wheel,
R = the rolling radius of the wheel, and
V = the speed of the aircraft.

If the slip $\lambda$ increases above a given threshold indicating that the aircraft has started skidding, the braking torque is reduced until the slip has decreased below the threshold. The known system suffers from certain disadvantages. In particular the system tends to be reactive as opposed to being proactive. For example, the system allows the wheels to skid before reducing the braking torque.

SUMMARY OF THE INVENTION

It is an object of the present invention to provide a method of braking and a braking apparatus that mitigates one or more of the above-mentioned disadvantages and/or to provide an improved method of braking and an improved braking apparatus.

The present invention provides a method of applying a braking force to a wheel of an aircraft moving along the ground, wherein the method comprises the steps of performing a calculation taking into account a parameter relating to the vertical load transmitted between the ground and the wheel, and applying a braking force to the wheel in dependence on the results of the calculation so performed.

By taking into account a parameter dependent on the vertical load transmitted between the ground and the wheel the braking force may be applied more efficiently and effectively. For example, by means of the method it may be possible to anticipate a skid, before the skid starts, and react accordingly. Thus, use of the method may be able to improve significantly the braking capability of the brakes of an aircraft and may be able to reduce the amount of time during which the wheels would otherwise have been skidding. Also, if and when a skid does occur, any information concerning the vertical loads at the time of the skid may advantageously be used in the future to help prevent, or at least help control, further skids. Said step of performing a calculation may, but need not necessarily, form part of a step of estimating the conditions at which the wheel would skid. In that case, the application of the braking force to the wheel is preferably applied in dependence on the results of the estimating step.

The method may be so performed that a change in the vertical load transmitted between the ground and the aircraft results in a substantially proportional change to the parameter relating to the vertical load transmitted between the ground and the aircraft. The parameter may for example be substantially equal to the vertical load, or could be such that the parameter is equal to the vertical load once scaled and possibly off-set.

The method may alternatively be performed so that a change in the time derivative of the vertical load transmitted between the ground and the aircraft results in a change to the parameter relating to the vertical load that is substantially proportional to the change in the time derivative of the vertical load. The parameter may for example be a measure of the rate of change of the vertical load. The method may, in such cases, include a step of calculating the change in the vertical load over a given length of time, for example by a method of integration.

The parameter relating to the vertical load may be ascertained by measuring a physical quantity, for example, the load itself, or quantities that vary primarily in dependence on the vertical load. The parameter may for example be measured by means of stress sensors positioned, for example, in or on the landing gear.

The parameter relating to the vertical load may be ascertained by estimating the vertical load from other measured parameters relating to other aspects of the aircraft, its movement, or other variables. For example, the vertical load may be estimated by performing a calculation in which one or more of the following parameters are taken into account: landing gear oleo shock absorber pressure, the extension of one or more strain gauges, for example, mounted on or in the landing gear of which the wheel is part, and acceleration of the aircraft. There may for example be provided one or more strain gauges which are able to measure the strain in relation to a single wheel, or in relation to a pair of wheels or in relation to a group of wheels. There may be one or more oleomatic sensors to measure the shock absorber pressure. There may be one or more accelerometers including for example monitoring devices that measure one or more of pitch roll, yaw and translational acceleration in any of three substantially orthogonal axes.

The calculation advantageously also takes into account at least one other parameter. Said other parameter advantageously provides information regarding the amount of slip. For example, the parameter may simply indicate whether or not a skid has been entered. Preferably said other parameter is at least partly dependent on the amount of slip between the wheel and the ground. For example, a slip parameter may be taken into account when performing the calculation, the slip parameter being such that the amount of slip between the ground and the wheel and the slip parameter are interrelated. The slip parameter may be directly or indirectly related to the amount of slip. For example, the slip parameter may relate to the horizontal loads in the direction of travel of the aircraft sustained by an axle of the wheel. The braking force applied may be controlled in dependence on both the parameter relating to vertical force and the slip parameter. The changes in either parameter from previous values may also be taken into account when calculating the braking force to be applied. Said other parameter may additionally or alternatively relate to the amount of braking torque applied to the wheel.

Data is advantageously ascertained regarding the relationship between slip and the ground to wheel friction coefficient. At least some of the data so ascertained is preferably used in the calculation, which affects the amount of braking force applied.

The method may include recording, over time, data relating to the relationship between the value of the friction coefficient and the value of slip. Having information regarding the slip/friction coefficient curve can assist in predicting the value of slip where a region of stable braking ends and the value of slip where a region of unstable braking begins. Such information is advantageously used to maximise the braking force applied, whilst seeking to avoid conditions at which skidding starts. Thus, the method preferably uses the data so recorded to improve the efficiency and effectiveness of braking. Preferably, the efficiency of braking is improved by means of a control unit that increases the braking such that the level of slip nears, but does not exceed, a level at which unstable braking starts, the control unit using the data recorded in order to assess the point at which unstable braking starts. The point at which unstable braking starts may be considered as the value of slip at which the friction coefficient is a maximum. The control unit may of course monitor one or both of the values relating to the slip and the friction coefficient to assess the point at which unstable braking begins.

The method preferably includes a step in which the slip parameter is ascertained by measuring a physical quantity. The physical quantity measured may for example be a measure of the horizontal load sustained by the aircraft or by a part of the aircraft.

The slip parameter relating to the slip between the ground and the wheel may be ascertained by means of measuring parameters relating to the aircraft speed and the speed of the periphery of the wheel. The slip, $\lambda$, may then be calculated by means of a formula identical or equivalent to:

$\lambda = a_o - a_1 \omega R/V$, where $\omega$=a parameter relating to the rotational speed of the wheel,
$R$=a parameter relating the rolling radius of the wheel,
$V$=a parameter relating the speed of the aircraft,
$a_0$=a constant that is preferably 1, but may be zero or any other value, and
$a_1$=a constant that is preferably 1, but may be minus one, or any other value.

The parameter $\omega$ may be the angular velocity of the wheel (for example, in radians per second i.e. equal to 2 Pi×Revs/second). The measured parameter may of course be equal to the number of revolutions per unit time, t (for example, the inverse of the time per revolution, which can be measured in a conventional manner). Ascertaining the parameter co may for example comprise a step of using means that are conventionally used to provide an indication of the rotational speed of the wheel.

As indicated above, formulae equivalent to $\lambda = a_o - a_1 \omega R/V$ may be used. For example, formulae such as $\lambda = a_o V - a_1 \omega$, or $\lambda = a_0 V/\omega R - a_1$ could be used to give a measure of the relative velocity between the periphery of the wheel and the ground.

The method may include a step in which a prediction is made regarding how the vertical load will change so that the braking force may be changed accordingly. That prediction may then be used to predict the maximum level of braking that can be applied whilst taking into account the desire to minimize the risk of causing the wheels to enter into a skid. Preferably, the step includes changing the braking force. Preferably, the method includes a step in which a prediction is made regarding how the vertical load will change and the prediction is taken into account when performing the calculation and/or the estimating step.

For example, it may be ascertained that the vertical load is increasing and a prediction may be made as to what the increase will be within a notional period of time. An increase in vertical load will generally increase traction and therefore reduce the slip encountered, whereas a decrease in vertical load will generally decrease traction and therefore increase the slip encountered. Therefore, on a predicted increase in the vertical load the braking force applied will advantageously be increased, because traction will have increased so that the chance of a skid is reduced, whereas on a predicted decrease in the vertical load the braking force applied will advantageously be decreased, to reduce the chance of encountering a skid that might otherwise have been caused. When an aircraft lands the vertical loads sustained at a given wheel tend to oscillate over time. The sign of change (i.e. positive or negative) of the vertical load at a given time can therefore be predicted with reasonable accuracy. The magnitude of the change in vertical load in a given time is preferably also estimated.

The method advantageously includes a step of estimating the conditions at which the wheel would skid. The method of performing a calculation may for example include such an estimating step. The estimating step preferably takes into account the vertical load transmitted between the ground and the wheel (or the aircraft). The step of applying a braking force to the wheel is preferably performed such that the braking force applied depends on the results of the estimating step. Preferably the braking force applied is adjusted to a level at which it is judged that the conditions for skidding will not be met whilst maintaining effective braking.

The method is preferably so performed that, if a skid is detected, the braking force is reduced in a way that takes into account data relating to the vertical load transmitted between the ground and the wheel. Controlling the reduction and subsequent increase of the braking force applied in view of information relating to the vertical load and/or in relation to the slip/friction coefficient curve is particularly advantageous. For example, an estimate of the profile of the braking force over time that should be applied to maximise the braking of the wheel over that time can be improved with the use of such information.

The method may include a step of ascertaining a parameter relating to the vertical load transmitted between the ground and the aircraft and outputting a first value dependent on that parameter. The calculation performed may involve the use of said first value. The method may also include ascertaining and outputting a second value representative of a further parameter, for example the amount of slip between the ground and the wheel. The calculation performed may involve the use of both the afore-mentioned first and second values.

The method preferably includes a step of ascertaining a parameter relating to the braking force applied to the wheel. The parameter is preferably taken into account when calculating the braking force to be applied to the wheel. The brakes may be actuated by means of a hydraulic system. In such a case, the method may for example include a step of ascertaining a parameter representative of the hydraulic pressure in the brake system, the parameter being taken into account when calculating the braking force to be applied to the wheel. The ascertaining of the parameter may comprise measuring the hydraulic pressure in brake system. The method may include ascertaining or estimating the braking torque or force applied to the wheels by means of a calculation involving a parameter relating to the braking pressure.

The method may include a step of estimating how the braking torque applied to the wheel changes with changes in other variables and varying the brake pressure applied to account for the changes in such other variables. For example, such other variables may include brake disc relative rotational speed, brake temperature, and moisture content in the brakes. The braking torque is likely to change over time, when a constant braking pressure is applied. Wheel speed, brake temperature and possibly other variables each affect the amount of braking torque resulting from the application of a given braking pressure. For example, as the amount of moisture in the brakes is reduced, the braking torque resulting from the same brake pressure may increase. By monitoring and assessing, how the braking torque varies with such variables, the braking pressure applied can be varied over time, in view of measurements made relating to those variables, in such a way as to account for the changes in the braking torque that are dependent on those variables. Assessing how the braking torque varies with changes in such variables can of course be assessed even when other parameters including the brake pressure are also varying. The braking pressure may be varied by taking into account the time that has elapsed since the brakes were actuated. Look-up tables may be stored electronically to enable a first approximation to be made regarding the braking torque that is being applied in relation to a given braking pressure, and in view of one or more other variables. Such look-up tables can be adjusted to take account of measurements made under the prevailing conditions, thereby improving the accuracy of the look-up tables.

Preferably, the parameter relating to the braking force is ascertained firstly by making an estimate of the braking force/torque, then estimating, by taking other known or measured parameters into account, how one or more such parameters, for example the angular velocity of the wheel, might change in a given period of time, then measuring and/or calculating said one or more such parameters and comparing the measured/calculated value(s) with the estimated values, and then improving the estimate of the braking force/torque in view of the comparison made. The estimate of the braking force may be improved by estimating the friction coefficient and using the resulting value to improve the estimate of the braking force. Such a method of ascertaining the parameter relating to the braking force/torque may be performed many times in a period of 0.5 seconds. Preferably the method is performed in such a way that the process is iterative in nature, for example, with the aim that the estimates become progressively more accurate. A reasonably accurate estimate of the braking force may thus be made.

The braking force or braking torque may alternatively be measured directly, with for example torque sensors.

Preferably the method is performed in such a way that the pilot is unable to have control of the braking of the wheels before the wheels have spun-up to a pre-set minimum rotational speed on touch-down. The braking of the wheels may however be under the overall control of the pilot after initial spin-up of the wheels. The level of maximum braking may be under the control of the pilot for at least some of the time during landing, the method of the invention providing automatic control if the level of braking needs to be reduced (or increased) at a give instant. The method may be performed in such a way that braking of the wheels is completely automated up to a point in time at which the speed of the aircraft decreases to below a pre-selected speed, for example, taxiing speed.

The invention also provides a method of decelerating an aircraft in which the above-described method is performed in respect of a multiplicity of the wheels and preferably in respect of the majority of, and preferably all of, the wheels to which a braking force is applied. The method is of particular advantage during the landing of an aircraft.

According to a further aspect of the invention there is provided a method of applying a braking force to a wheel of an aircraft moving along the ground, the method comprising the steps of a) estimating the conditions at which the wheel would skid, the estimating step taking into account the vertical load transmitted between the ground and the wheel, and b) applying a braking force to the wheel in dependence on the results of the estimating step.

The invention also provides a braking control apparatus, and a processor associated with the braking control apparatus, for controlling the braking of an aircraft wheel in accordance with the method of the present invention. According to an aspect of the invention there is thus provided a braking control apparatus for controlling the braking of an aircraft wheel and a processor associated with the braking control apparatus, the apparatus being connectable to the brakes of at least one wheel of an aircraft and the processor being able to be connected to receive in use signals relating to the vertical load transmitted between the ground and the aircraft wheels, the processor being so arranged that in use it performs a calculation using data derived from the signals received by the processor, wherein the control apparatus is so arranged that in use the control apparatus actuates the brakes in dependence on the results of the calculation performed by the processor, whereby the control apparatus is able to control the actuation of the brakes taking into account the vertical load. The present invention also provides, according to a further aspect of the invention, a braking control apparatus for controlling the braking of an aircraft wheel and a processor associated with the braking control apparatus, the apparatus being connectable to the brakes of at least one wheel of an aircraft and the processor being able to be connected to receive in use signals relating to the vertical load transmitted between the ground and the aircraft wheels, the processor being so arranged that in use it performs a calculation using data derived from the signals received by the control apparatus and estimates the conditions at which the wheel would skid, the estimating step taking into account the vertical load transmitted between the ground and the wheel, wherein the control apparatus is so arranged that in use the control apparatus actuates the brakes in dependence on the results of the calculation performed by the processor, whereby the control apparatus is able to control the actuation of the brakes taking into account the vertical load and other conditions that affect the likelihood of skidding.

Optional and/or preferred features relating to either aspect of the invention described above relating to the control apparatus and/or the processor will now be described.

The control apparatus and/or the processor may be supplied separately from the aircraft to allow the present invention to be retrofitted. An existing control apparatus and/or processor may be able to be converted and reprogrammed to a control apparatus and/or processor according to this aspect of the present invention. Of course, in use, the control apparatus will be connected to the brakes of an aircraft and the processor will be connected to one or more sensors. Such connections may be direct or indirect. For example, other control systems or processors of the aircraft may be required to ascertain data relating to various parameters and the processor of the present invention may simply use that data. The processor may form a part of the control apparatus. The processor is advantageously able to receive, in use, signals relating to the amount of slip between the ground and the wheel so that data derived from such signals may also be used in the calculations performed by the processor. The processor is preferably connectable in use to receive signals from a wheel speed sensor and an aircraft speed sensor. The processor may be connectable to one or more accelerometers. The processor may be connectable in use to a strain gauge or a force or pressure sensor in order to assess the vertical load transmitted between the ground and the aircraft. The processor may for example receive signals from an air data inertial reference unit (commonly referred to by the acronym ADIRU).

Preferably, the control apparatus and processor are so arranged that the apparatus is able to perform the method according to the present invention. The processor is advantageously programmed to perform one or more of the various aspects of the above-described method. For example, the processor may be programmed to estimate how the vertical load will change in a given period of time. The processor may then estimate the braking force that, if applied, would result in a given amount of slip (preferably the optimum slip for efficient and effective braking) and output a signal that causes the brakes to be actuated in accordance with the braking force so estimated. The processor may also estimate the conditions at which the wheel might skid by taking into account data relating to the vertical load transmitted between the ground and the aircraft and data relating to the slip between the ground and the wheel. The processor may then send an output signal which causes the brakes to be actuated to provide a braking force at such a level that the conditions for skidding are not met whilst maintaining effective braking. The processor advantageously monitors the slip and possibly other parameters for the start of a skid. The processor is preferably arranged so that if a start of skid is detected the braking force is reduced, preferably in a way that takes into account data relating to the vertical load transmitted between the ground and wheel. The processor advantageously calculates the slip by means of a calculation using data regarding the aircraft speed and the speed of the periphery of the wheel. The data regarding the speed of the periphery of the wheel may simply be data representative of the revolutions per unit time of the wheel, which together with the knowledge of the rolling radius of the wheel can be used to calculate the peripheral speed of the wheel.

The processor may be provided with a memory in which data may be stored to improve the performance of the control apparatus. Data may for example be ascertained regarding the relationship between slip and the ground to wheel friction coefficient. Such data may be stored in the memory. Each time a skid is encountered, the processor preferably stores in the memory data regarding the relationship. Such data may for example be able to be used later to provide valuable information regarding the conditions at the time of landing (for example information regarding the condition of the runway). The processor may for example use such data when calculating the braking force to be applied to the wheel.

The braking force may be chosen on the basis of an estimate of the force which would achieve the maximum ground to wheel friction coefficient. The estimate is preferably calculated in view of the data regarding the relationship between the friction coefficient and slip stored in memory. The anticipated effect on the relationship between slip and the friction coefficient of a change in other parameters, including for example the vertical ground to wheel load, may also be taken into account. The processor preferably stores in memory several sets of data relating to the relationship between the friction coefficient and slip. Each time a skid is started a new or additional set of data concerning the relationship may be stored in memory.

The memory may be used to store other data. For example, data may be stored regarding the signal level required to be sent to the brakes in order to achieve a desired braking torque or braking force at the wheel. For example, if the brakes are actuated by means of hydraulic system, the memory may store data concerning the hydraulic pressure required in the brake system in order achieve a given brake force at the wheel. As is mentioned above, the brake torque applied in response to a given hydraulic brake pressure is dependent on various factors. The memory may include data concerning how the relationship between the brake torque and brake pressure varies in response to changes in a further parameter. The processor may update and enhance this data by taking into account measurements made during use of the control apparatus in order to improve the accuracy of the data (or at least to improve the accuracy of the data in relation to the conditions at the time of use of the control apparatus).

Also, the method of the present invention is preferably performed with the use of a control apparatus and processor according to the present invention.

The present invention also provides a landing gear assembly connected to a control apparatus as described above.

The invention further provides a control unit and a landing gear assembly for an aircraft, the assembly including at least one aircraft wheel, the control unit being able in use to actuate the brakes of said at least one wheel in accordance with the method of the present invention. According to an aspect of the present invention, there is thus provided a control unit and a landing gear assembly for an aircraft, the assembly including at least one aircraft wheel, the control unit being able in use to actuate the brakes of said at least one wheel, the control unit including a processor, which is connected to receive data signals relating to the vertical load transmitted between the ground and the aircraft wheels, and which in use performs a calculation using data derived from the data signals received by the processor, wherein the control unit is so arranged that in use the control unit actuates the brakes in dependence on the results of the calculation performed by the processor. According to a yet further aspect of the invention there is also provided a control unit and a landing gear assembly for an aircraft, the assembly including at least one aircraft wheel, the control unit being able in use to actuate the brakes of said at least one wheel, the control unit including a processor, which is connected to receive data signals relating to the vertical load transmitted between the ground and the aircraft wheels, and which in use performs a calculation using data derived from the data signals received by the processor and estimates the conditions at which the wheel would skid, the estimating step taking into account the vertical load transmitted between the ground and the wheel, wherein the control unit is so arranged that in use the control unit actuates the brakes in dependence on the results of the calculation performed by the processor. In relation to either aspect of the invention described above relating to the control unit and a landing gear assembly for an aircraft, it will be appreciated that the processor may be located in a different physical location to the rest of the control unit.

There is further provided an aircraft including a processor, a control unit and/or a landing gear assembly according to the above-described invention.

There is also provided a method of landing an aircraft including performing the steps of the above-described method.

Reference is made herein to steps of calculating, measuring and/or ascertaining parameters, variables and the like. It will of course be understood that in at least some embodiments of the invention such steps will be performed in such a way that the resulting numerical value(s) attributed to the parameter(s), variable(s) or the like will differ from the actual value(s) present in the physical system being modelled. Such differences may result from errors in measurements made or may result from errors introduced by the particular model chosen to represent the physical system. The possibility of such errors can, if necessary, be taken into account or can, if sufficiently small, simply be ignored when putting the present invention into practice.

An embodiment of the invention will now be described by way of example with reference to the accompanying drawings of which:

DETAILED DESCRIPTION OF PREFERRED EMBODIMENT

The embodiment of the present invention relates to a braking control system for controlling the braking of a wheel of an aircraft landing gear assembly during landing of the aircraft.

Figure 1:
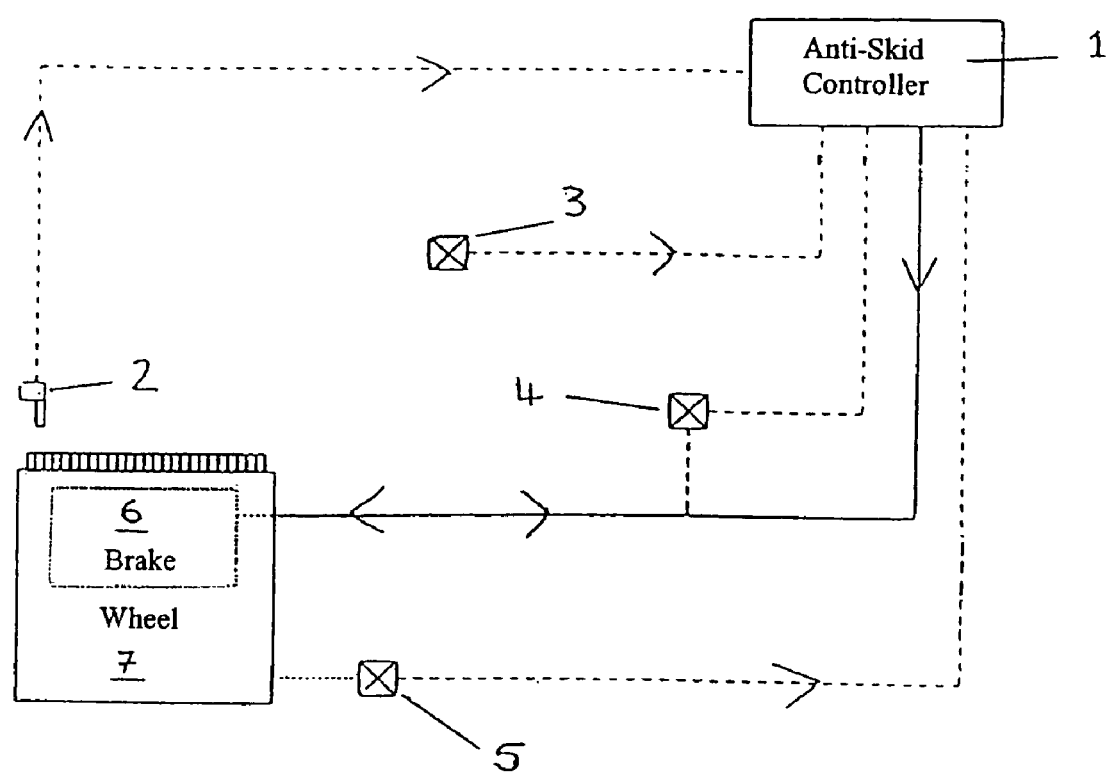
FIG. 1 shows a braking control system according to the embodiment.

FIG. 1 shows a schematic diagram illustrating the operation of the braking control system of the present invention. The system comprises an anti-skid controller 1 which is connected to a wheel speed transducer 2, a vehicle velocity transducer 3, a brake actuation transducer 4 and a vertical load transducer 5. The anti-skid controller 1 is also connected to a brake 6, which is able to effect a braking action on the wheel 7.

Vertical loads between the ground and the wheel are ascertained by means of strain gauges on the landing gear, an electronic signal representative of the vertical load so ascertained being sent from the vertical load transducer 5 to the anti-skid controller 1. Strain gauges, such as piezoelectric strain gauges, may be used to measure individual, paired or grouped wheel loads. The vertical load (or change in vertical load) may be calculated in respect of a wheel, or a number of, wheels. Conventional transducers are used in the system and include an aircraft ground speed transducer, a brake pressure transducer, and a wheel speed transducer.

During landing, the brake 6 is instructed by the controller 1, after for example receiving an instruction from the pilot, to exert a braking force on the wheel and thereby cause the wheel to decelerate or stop. The anti-skid controller 1 receives signals from the wheel speed transducer 2, the vehicle velocity transducer 3, the brake actuation transducer 4 and the vertical load transducer 5, the signals being representative of wheel speed, and vehicle velocity, the pressure in the hydraulic system that actuates the brake, and the vertical load between the wheel and the ground, respectively. The signals are used to assist in the efficient and effective use of the brakes as is described in further detail below. In particular, the anti-skid controller 1 is able to control the braking force applied by the brake 6 to the wheel 7 in order to reduce the amount of skidding.

In order to understand better how the anti-skid controller 1 is able to control the brakes in a more efficient manner it is useful to consider the tyre/ground dynamics and the relationship between slip $\lambda$ and the friction coefficient $\mu$.

Figure 2:
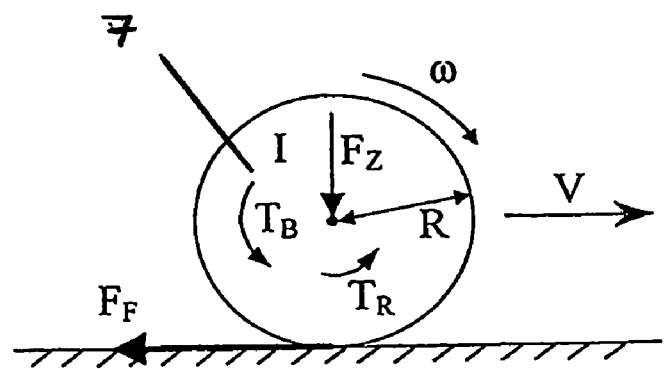
FIG. 2 shows the tyre/ground dynamics in relation to the wheel of an aircraft on the ground.

FIG. 2 shows the tyre/ground dynamics of a typical wheel, tyre and brake assembly. The system illustrated by FIG. 2 may be summarised by the following equations:

$$I\frac{d\omega}{dt} = RF_F - T_B - T_R \qquad (1)$$

$$F_F = \mu F_Z$$

$$I\frac{d\omega}{dt} = \mu F_Z R - T_B - T_R$$

Where:
I=Rotational moment of inertia,
$d\omega/dt$=Angular acceleration of wheel,
$\mu$=Tyre/ground friction coefficient,
$F_Z$=Vertical load acting on wheel,
$F_F$=Frictional force due to braking=$\mu F_Z$,
$T_B$=Braking Torque,
$T_R$=Torque due to rolling resistance,
V=Aircraft speed,
$\omega$=Angular velocity of wheel, and
R=Rolling radius of wheel.

A skid will occur when the wheel speed has decreased sufficiently below the aircraft speed (V). The percentage difference between the aircraft speed and peripheral wheel speed (the angular velocity multiplied by the rolling radius) is defined as the slip of the tyre ($\lambda$), such that $$\lambda = 1 - \frac{\omega R}{V}, \qquad (2)$$

where
$\omega$=Angular velocity of wheel,
R=Rolling radius of wheel, and
V=Aircraft speed.

A skid will normally either be due to an increase in braking torque $T_B$, or a decrease in tyre friction force $F_F$. A decrease in tyre friction force $F_F$, which is equal to the product $\mu F_Z$, may be due to a decrease in $\mu$ and/or $F_Z$. The anti-skid system of the present embodiment measures/infers vertical loads, or changes in vertical load, and can from that information predict when skids might occur, for example when there are reductions in the vertical load $F_Z$.

Figure 3:
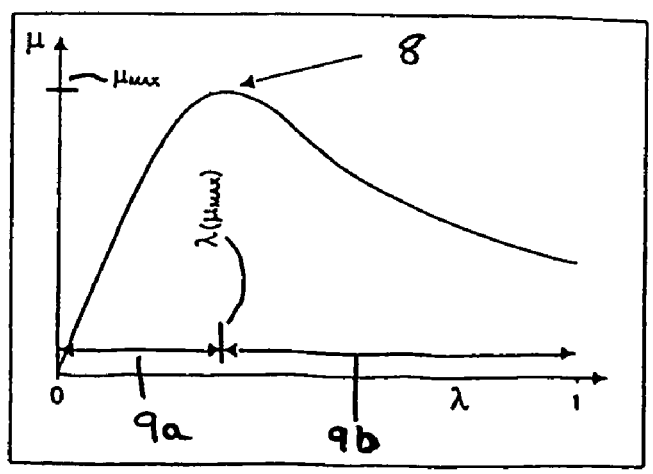
FIG. 3 shows the characteristics of a tyre/ground interface in terms of the relationship between the friction coefficient and the amount of slip between the tyre and ground.

FIG. 3 shows the characteristics of a tyre/ground interface by means of a $\mu$/slip curve. When the slip $\lambda$ is greater than $\lambda_{\mu MAX}$ the value of $\lambda$ at the maximum value of $\mu$—see region 8 on the graph), an increase in slip will cause a decrease in μ and therefore a further increase in slip. Unless the braking torque applied is released, the wheel will rapidly decelerate and eventually lock-up. When slip is greater than $\lambda_{\mu MAX}$ there is effectively a positive feedback loop, which causes slip to increase very quickly. The region 9b of the μ-λ curve corresponding to the condition $\lambda > \lambda_{\mu MAX}$ may thus be considered as a region of unstable braking, whereas the region 9a corresponding to the condition $\lambda < \lambda_{\mu MAX}$ may be considered as a region of stable braking. It may therefore be defined that a skid occurs when the slip increases above $\lambda_{\mu MAX}$. Different conditions will change $\lambda_{\mu MAX}$, $\mu_{MAX}$, the shape and slope of the μ/slip curve and the relative positions of the stable and unstable regions 9a, 9b.

The optimum braking efficiency is achieved when the slip is maintained at or just below $\lambda_{\mu MAX}$, which corresponds to the maximum coefficient of friction. Therefore, when the pilot demands braking that would otherwise cause a skid, the anti-skid controller 1 seeks to maintain the braking torque so that the slip between the wheel and ground is maintained at a level as close to $\lambda_{\mu MAX}$ without significantly exceeding $\lambda_{\mu MAX}$, so that optimum braking may be achieved. In order to achieve this aim, the controller 1 ascertains information concerning the constantly changing shape of the μ-λ curve and other changing parameters that cause changes in μ and λ and adapts the braking torque applied accordingly. The function of the anti-skid controller 1 is described in further detail below.

The dynamics of the tyre/ground interface are extremely complex and influenced by many factors; such as vertical-load, vehicle and wheel speeds, brake actuation and rate of change of brake actuation, ground conditions, tyre wear, and tyre temperature. Conventional aircraft anti-skid systems have based the control of the said dynamics on the measurement of the aircraft speed, wheel speed and brake actuation only.

The system of the present embodiment is able to use information concerning the vertical loads in several different ways to improve wheel braking efficiency and effectiveness.

The anti-skid system uses the vertical load information to determine more accurately when a skid could occur and, also when skids do occur, the causal reasons behind such skids. Knowing the cause of a skid can assist both in controlling the skid efficiently and possibly in helping to avoid encountering a skid of the same, or a similar, cause again.

The system is able to predict impending skids by monitoring vertical loads or changes in vertical loads. Predictions are thus made regarding when a wheel is likely to skid. The system is of course also able to detect that a wheel is skidding. If a skid is predicted or detected, the system reacts by adapting the braking effort in view of the input data, which includes vertical loads or changes in vertical loads, wheel speed, friction coefficient μ, slip λ, aircraft speed, and brake pressure. The system can then seek to avoid such skids by regulating the braking torque applied accordingly.

When a skid is detected on a wheel the braking is reduced so that it is allowed to spin up. Once the wheel has spun up satisfactorily the braking actuation is reapplied. The way in which the braking is reduced is determined by all, or some, inputs received by the control system, including vertical loads or changes in vertical loads.

The monitoring of the vertical loads or changes in vertical loads allows the system to estimate the μ-slip characteristics of the tyre/ground interface. This information is then used to predict skids before they occur. μ can be calculated/estimated using equation (1) (mentioned above with reference to FIG. 2); the other parameters in the equation will be known (R, I, $T_R$), or can be ascertained from measurements (dω/dt, $F_z$, $T_B$).

Thus, the control system infers the underlying interactions between tyre and ground, and learns from said information to improve the control and avoidance of skids.

The increased intelligence of the system by means of monitoring vertical load, or changes in vertical load, increases efficiency in braking and can reduce, if not eliminate, the occurrence of skids, thus reducing tyre wear.

The tyre friction force, due to braking, is a combination of the vertical load $F_z$ and the friction coefficient μ. The system monitors $F_z$ and is thus able to measure when the frictional force is likely to be reducing. Consider, for example, a situation where the anti-skid system detects a reduction in the vertical load acting on the tyre/ground interface. If the tyre/runway interface is near the optimum friction coefficient there is a chance that a reduction in vertical load could lead to a skid. The system attempts to anticipate the skid and reduces the braking torque before the skid occurs. Conversely, the system increases the braking torque, if the vertical load increases.

If the vertical load is known, it is possible to estimate the friction coefficient for the tyre/ground interface. The rotational moment of inertia—I, and Rolling radius—R are known in advance, remain substantially constant and are pre-programmed into memory accessible by the anti-skid controller 1. The torque due to rolling resistance—$T_R$ may be estimated in view of the values of other measured parameters. The torque due to rolling resistance, $T_R$, may be sufficiently small that it can be assumed to be zero in certain cases. The system calculates the wheel angular acceleration—dω/dt from the wheel speed sensor and calculates the braking torque $T_B$ from the brake pressure P and a predetermined torque/pressure relationship for the brake. By calculating the friction coefficient μ and slip λ the system determines information concerning a μ/slip curve, which is then used to optimise the braking performance.

The load variation can be very high, particularly during, and soon after landing, therefore, vertical load measurement will be particularly beneficial in an aircraft based environment.

Figure 4:
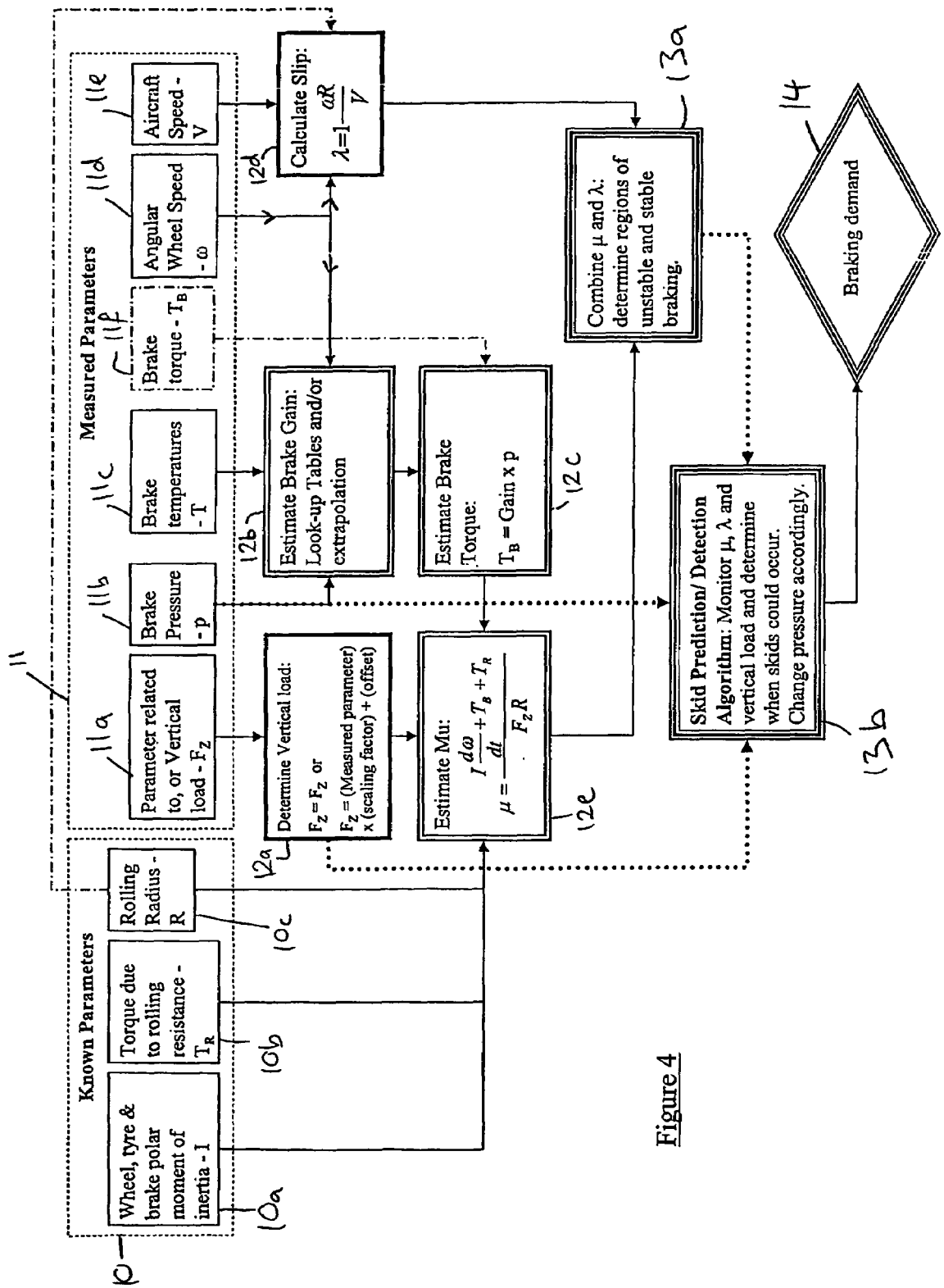
FIG. 4 shows a flow diagram illustrating the method of operation of the braking control system.

FIG. 4 shows a flow diagram illustrating the method of operation of the braking control apparatus shown in FIG. 1. The parameters used in the method include known parameters (indicated by box 10) and measured parameters (indicated by box 11).

The known parameters 10 include the moment of inertia I of the rotating wheel system including the wheel, tyre and brake (box 10a), the torque $T_R$ due to rolling resistance (box 10b) and the rolling radius R of the tyre (box 10c). The measured parameters 11 include the vertical load $F_z$, or a parameter relating to the vertical load, (box 11a), the pressure P in the hydraulic system supplying the brake (box 11b), the temperature T of the brake (box 11c), the angular velocity ω of the wheel (box 11d), and the speed V of the aircraft along the ground (box 11e). Whilst it is difficult reliably to measure directly the braking torque $T_B$ applied, such a measurement may also be made, which possibility is represented by box 11f.

The parameters 11 are measured periodically and then used by the processor in various calculations. The initial calculating steps are indicated in FIG. 4 by boxes 12a to 12e.

In a case where the vertical load $F_z$ between the wheel and ground is not directly measured, the processor estimates the vertical load from the measured parameter that relates to the vertical load $F_z$. Such a step may require multiplying the measured parameter by a scaling factor and then offsetting that value by a pre-set amount. Depending on the parameter measured, other calculations may be required in order to estimate the vertical load (for example, if the relationship between the measured parameter and the vertical load is non-linear). Estimating the vertical load is indicated by box 12a in FIG. 4.

Boxes 12b and 12c illustrate the method of estimating the brake torque (assuming that the brake torque has not been measured directly in the step represented by box 11f). Box 12b represents a step of estimating the brake gain, that is the scaling factor that defines the relationship between the brake torque applied in response to a given hydraulic pressure in the brake system and that hydraulic pressure. Various factors affect the brake gain, including the brake temperature T, and the angular velocity ω of the wheel. The gain can be estimated by using look-up tables in which a value of the gain is given in relation to a range of values of brake temperature, brake pressure and angular velocity ω of the wheel. Intermediate values may be calculated by interpolation. The brake torque is then estimated (see box 12c) by calculating the product of the brake gain ascertained in the previous step and the brake pressure P.

The initial estimate of the brake gain. (see box 12b) may be improved by means of iterative/extrapolation techniques. Once a relationship between the braking torque and the brake pressure has been estimated, the accuracy of that estimate can be assessed by making further measurements of various parameters thereafter, predicting what the measurements will be and comparing the measurements made with those predicted. An estimate may then be made of the error in the brake torque as originally calculated compared to the brake torque that, it is calculated, would have to have been applied in view of the values of the further measurements. Mathematical techniques enabling two unknowns from an equation to be ascertained from sets of measured sample data of the other parameters of the equation are advantageously used to estimate values of the two unknown parameters in this case (i.e. the braking torque and the friction coefficient μ). Such mathematical techniques may for example use the initial estimated values of the unknowns as a starting point and may thereafter produce improved values for the unknowns. Such techniques may for example be iterative in nature. The resulting values calculated by such techniques may then be used to improve the model/equation with which the value of the brake gain is calculated.

Box 12d represents a calculation in which the amount of slip between the tyre and ground is calculated by the formula $$\lambda = 1 - \frac{\omega R}{V}.$$

The friction coefficient μ is estimated (see box 12e) by means of the following calculation:

$$\mu = \frac{I \frac{d\omega}{dt} + T_B + T_R}{F_z R} \quad (3)$$

The estimates of μ and λ (represented by boxes 12d and 12e) are recorded over time. The record of the relationship between μ and λ is used (see box 13a) to determine the regions of unstable and stable braking. As described above in relation to FIG. 3, the condition at which unstable braking occurs is defined by $\lambda > \lambda_{\mu max}$. The values of μ and λ are therefore monitored to assess whether or not conditions are approaching those at which unstable braking occurs.

Box 13b represents the main skid prediction/detection algorithm. The calculated values of μ, λ, the vertical load $F_z$ and the measured parameter of the brake pressure P are all monitored to assess both when the aircraft wheel has started skidding and also to predict when skids might occur. If a skid is predicted or detected the braking pressure is changed accordingly. There are various means by which a skid may be detected. The algorithm will deem that a skid has been detected if either the calculated slip λ exceeds the slip at which the friction coefficient μ is at a maximum (i.e. if $\lambda > \lambda_{\mu MAX}$) or the rate of change of slip exceeds a preset threshold, $$S_{max} \left( \text{i.e. if } \frac{d\lambda}{dt} > S_{max} \right).$$

There are also various ways in which whether a skid will occur in the near future may be predicted. The algorithm assesses either whether the slip λ is approaching the slip at $\mu_{max}$ (i.e. if λ continues to increase in the same way as it has previously, will it exceed $\lambda_{\mu max}$ within a given period of time), or whether the vertical load decreases below a preset threshold (or the rate of change of vertical load decreases below a preset negative threshold) and the slip is greater than a preset value of slip, which is less than but close to $\lambda_{\mu max}$.

If a skid is detected or is predicted then the skid protection/detection algorithm reduces the brake pressure applied at a rate dependent on all of the factors consisting of the difference between the calculated slip λ and $\lambda_{\mu max}$, the rate of change of slip dλ/dt, the measured brake pressure P, the measured vertical load $F_z$, and the rate of change of vertical load $dF_z/dt$.

The algorithm continuously monitors for the detection and prediction of skids and will, where appropriate take action, for example by causing the brake pressure to be changed appropriately (the application of the brakes being represented by box 14). When a pilot of the aircraft demands a level of braking to be applied, the appropriate braking torque will be applied, unless it is determined by the algorithm that the requested braking torque is too high. Thus, the braking algorithm effectively causes an optimum braking torque to be applied, the torque applied not being greater than a maximum torque equivalent to the level of braking demanded by the pilot. If conditions are such that the algorithm determines that the braking torque demanded by the pilot is too high, a lower torque will be applied; if conditions then change so that the algorithm judges that a higher braking torque may be safely applied, the braking torque applied will increase (up to a maximum torque equal to the braking torque demanded by the pilot).

Various modifications may of course be made to the above-described embodiment without departing from the spirit of the present invention. For example, alternative means of measuring/inferring the vertical loads or changes in the vertical loads may be used instead of, or in addition to, the strain gauges. Examples of such alternative means are described below.

Calculations of vertical load can be performed in respect of measurements of tyre pressures. Accelerometers, such as pitch, roll and/or yaw monitoring devices, and/or x, y and z axis acceleration monitoring devices can be used to infer vertical loads or changes in vertical loads on one, or a number of, wheel(s). Oleomatic pressure sensors in the oleo shock absorbers of the landing gear may also provide an indication of the vertical loads sustained.

As mentioned above, rather than estimating the braking torque $T_B$ applied, the torque could alternatively be measured directly. Torque sensors could for example be provided to measure the torque directly for each wheel concerned.

The invention claimed is:

1. A method of applying a braking force to a wheel of an aircraft moving along the ground, wherein the method comprises the steps of:
   estimating the conditions at which the wheel would skid; and
   applying the braking force to the wheel in dependence on the results of the estimating step; wherein
   the estimating step including both taking into account the vertical load transmitted between the ground and the wheel and taking into account a variable relating to the braking force to be applied.

2. A method according to claim 1, wherein the braking force is applied at a level ax which it is judged that the conditions for skidding will not be met whilst maintaining effective braking.

3. A method according to claim 1, wherein the estimating step includes taking into account a variable relating to time, whereby estimating the conditions at which the wheel would skid includes estimating when the wheel is likely to skid.

4. A method according to claim 1, wherein the estimating step includes the performance of a calculation, in which a parameter relating to the vertical load transmitted between the ground and the wheel is taken into account.

5. A method according to claim 4, wherein a slip parameter is taken into account when performing the calculation, the slip parameter being such that the amount of slip between the ground and the wheel and the slip parameter are interrelated.

6. A method according to claim 5, wherein data is ascertained regarding the relationship between slip and the ground to wheel friction coefficient and at least some of the data so ascertained is used in the calculation.

7. A method according to claim 5, wherein the method includes recording, over time, data relating to the relationship between the value of the friction coefficient and the value of slip.

8. A method according to claim 5, wherein the method includes ascertaining the slip parameter relating to the slip between the ground and the wheel by means of measuring parameters relating to the aircraft speed and the speed of the periphery of the wheel.

9. A method according to claim 1, wherein the method further comprises a step in which a prediction is made regarding how the vertical load will change and the prediction is taken into account when performing the estimating step.

10. A method according to claim 1, wherein the method is so performed that, if a skid is detected, the braking force is reduced in a way that takes into account data relating to the vertical load transmitted between the ground and the wheel.

11. A method according to claim 1, wherein braking is applied by means of a hydraulic system, and the method includes a step of ascertaining a parameter representative of the hydraulic pressure in the brake system, the method including a step of calculating the braking force to be applied to the wheel, the parameter being taken into account when performing that calculation.

12. A method of applying a braking force to a wheel of an aircraft moving along the ground, wherein the method comprises the steps of:
   ascertaining a first parameter dependent on the amount of slip between the ground and the wheel;
   ascertaining a second, parameter dependent on the ground to wheel friction coefficient;
   ascertaining a third parameter dependent on the vertical load transmitted between the ground and the wheel;
   recording, over time, data relating to the relationship between the first and second parameters;
   estimating the conditions at which the wheel would skid, the estimating step including the performance of a calculation, in which the first, second and third parameters are taken into account; and
   applying a braking force to the wheel in dependence on the results of the estimating step.

13. A method according to claim 12, wherein a control unit controls the braking force applied such that the level of slip nears, but does not exceed, a level at which unstable braking starts, the control unit using the recorded data in order to assess the point at which unstable braking starts.

14. A method according to claim 12, wherein at least some of the data relating to the relationship between the first and second parameters is used in the calculation preformed in the estimating step.

15. A method of applying a braking force to a wheel of an aircraft moving along the ground, wherein the method comprises the steps of:
   making a prediction concerning how the vertical load transmitted between the ground and the wheel will change;
   estimating the conditions at which the wheel would skid, the estimating step taking into account the prediction concerning how the vertical load will change; and
   applying a braking force to the wheel in dependence on the results of the estimating step.

16. A method of applying a braking force to a wheel of an aircraft moving along the ground, the brakes being actuated by means of a hydraulic system, wherein the method comprises the steps of:
   estimating the conditions at which the wheel would skid; the estimating step taking into account the vertical load transmitted between the ground and the wheel;
   ascertaining a hydraulic pressure parameter representative of the hydraulic pressure in the brake system, calculating the braking force to be applied to the wheel taking into account the results of the estimating step and the hydraulic pressure parameter; and
   applying the braking force so calculated to the wheel.

17. A method according to claim 16, wherein the method includes a step of estimating how the braking force applied changes with changes in other variables and varying the braking pressure applied to account for the changes in such other variables.

18. A braking control apparatus for controlling the braking of an aircraft wheel and a processor associated wit the braking control apparatus, wherein:
   the apparatus is connectable to the brakes of at least one wheel of an aircraft,
   the processor is able to be connected to receive in use signals relating to the vertical load transmitted between the ground and the aircraft wheels;
   the processor is so arranged that in use it performs a calculation using data derived from the signals received by the control apparatus and estimates the conditions at which the wheel would skid taking into account hot the vertical load transmitted between the ground and the wheel and a variable relating to the braking force to be applied; and the control apparatus is so arranged that in use the control apparatus actuates the brakes in dependence on the results of the calculation performed by the processor, whereby the control apparatus is able to control the actuation of the brakes taking into account the vertical load and other conditions that affect the likelihood of skidding.

19. An aircraft comprising a braking control apparatus and processor according to claim 18.

20. A braking control apparatus for controlling the braking of an aircraft wheel and a processor associated with the braking control apparatus, wherein:

the apparatus is connectable to the brakes of at least one wheel of an aircraft;

the processor is able to be connected to receive in use signals relating to the vertical load transmitted between the ground and the aircraft wheels;

the processor is so arranged that in use it performs a calculation using data derived from the signals received by the control apparatus, the calculation including:

making a prediction concerning how the vertical load transmitted between the ground and the wheel will change, and estimating the conditions at which the wheel would skid taking into account both the vertical load transmitted between the ground and the wheel and the prediction concerning how the vertical load will change, and the control apparatus is so arranged that in use the control apparatus actuates the brakes in dependence on the results of the calculation performed by the processor, whereby the control apparatus is able to control the actuation of the brakes taking into account the vertical load and other conditions that affect the likelihood of skidding.

21. An aircraft comprising a braking control apparatus and processor according to claim 20.

22. A control unit and a landing gear assembly for an aircraft, the assembly including at least one aircraft wheel, the control unit being able in use to actuate the brakes of said at least one wheel, wherein:

the control unit includes a processor, which is connected to receive data signals relating to the vertical load transmitted between the ground and the aircraft wheels, and which in use performs a calculation using data derived from the data signals received by the processor and estimates the conditions at which the wheel would skid, the estimating step taking into account both the vertical load transmitted between the ground and the wheel and a variable relating to the braking force to be applied, and the control unit is so arranged that in use the control unit actuates the brakes in dependence on the results of the calculation performed by the processor.

23. An aircraft comprising a control unit and a landing gear assembly according to claim 22.

24. A control unit and a landing gear assembly for an aircraft, the assembly including at least one aircraft wheel, the control unit being able in use to actuate the brakes of said at least one wheel, wherein:

the control unit includes a processor, which is connected to receive data signals relating to the vertical load transmitted between the ground and the aircraft wheels, and which in use performs a calculation using data derived from the data signals received by the processor and estimates the conditions at which the wheel would skid, the estimating step taking into account both the vertical load transmitted between the ground and the wheel and a prediction concerning how the vertical load will change, and the control unit is so arranged that in use the control unit actuates the brakes in dependence on the results of the calculation performed by the processor.

25. An aircraft comprising a control unit and a landing gear assembly according to claim 24.

* * * * *